(12) United States Patent
Yang

(10) Patent No.: US 6,955,510 B2
(45) Date of Patent: Oct. 18, 2005

(54) VEHICLE TIE DOWN RAIL CONJOINMENT STRUCTURE

(75) Inventor: Yin-Shu Yang, Tainan Hsien (TW)

(73) Assignee: Her Jiunn Industry Co., Ltd, Tainan Hsien (TW)

( * ) Notice: Subject to any disclaimer, the term of this patent is extended or adjusted under 35 U.S.C. 154(b) by 0 days.

(21) Appl. No.: 10/774,392

(22) Filed: Feb. 10, 2004

(65) Prior Publication Data

US 2005/0175428 A1   Aug. 11, 2005

(51) Int. Cl.⁷ ................................................. B60P 7/08
(52) U.S. Cl. ..................... 410/106; 410/110; 410/116; 403/7; 403/314; 403/409.1
(58) Field of Search ............................... 410/101, 106, 410/110, 115, 116; 296/43; 403/7, 289, 295, 403/314, 409.1; 248/499

(56) References Cited

U.S. PATENT DOCUMENTS

| | | | |
|---|---|---|---|
| 5,476,349 A * | 12/1995 | Okland | 410/106 |
| 5,618,140 A * | 4/1997 | Okland | 410/106 |
| 5,873,688 A * | 2/1999 | Wheatley | 410/106 |
| 5,904,458 A * | 5/1999 | Bundy | 410/106 |
| 5,967,719 A * | 10/1999 | Davenport | 410/106 |
| 5,997,227 A * | 12/1999 | Bundy | 410/106 |
| 6,231,285 B1 * | 5/2001 | Elwell et al. | 410/107 |
| 6,247,881 B1 * | 6/2001 | Shuen | 410/106 |
| 6,312,202 B1 * | 11/2001 | Benedict | 410/116 |
| 6,468,009 B2 * | 10/2002 | Elwell et al. | 410/107 |

* cited by examiner

Primary Examiner—Stephen Gordon
(74) Attorney, Agent, or Firm—Bacon & Thomas

(57) ABSTRACT

A vehicle tie down rail conjoinment structure comprised of a first connector and a second connector each having a mounting surface at one extremity and an oblique slip-thrust surface formed at the opposite extremity. A threaded fastening component is utilized to conjoin the first connector and the second connector into a single physical entity, wherein the first connector is inserted into the inner diameter at the end section of the curved anchor footing of a vehicle tie down rail and the second coupling section is inserted into the inner diameter of the straight, thin long pipe member at the end section of the vehicle tie down rail.

4 Claims, 1 Drawing Sheet

VEHICLE TIE DOWN RAIL CONJOINMENT STRUCTURE

BACKGROUND OF THE INVENTION

1) Field of the Invention

The invention herein relates to automotive accessories, specifically a vehicle tie down rail conjoinment structure in which when the two pipe segments of the tie down rail are conjoined, the radially distributed force vectors of the two connectors tightly bind the two pipe segments together.

2) Description of the Related Art

Passenger/cargo dual-use trucks equipped with drivers seats and open-beds are in widespread use, such vehicles often having tie down rails installed along the two sides of the bed; examples of these structures include U.S. Pat. Nos. 5,476,349, 5,618,140, 6,231,285, and 6,468,009. In a typical arrangement, the tie down rail usually has an anchor body disposed at each of its two extremities and a straight tube is situated between the curved pipe section tube receiving ends connecting the two anchor bodies, with a bolt hole or tie down member provided on the anchor body for the attachment of lines.

Since the curved pipe sections of this category of tie down rail are compression cast, there is a strong contrast in the glossy surface of the straight stainless steel pipe sections where they are formed as well as inadequate structural quality, requiring a few unnecessary bolt holes or tie down components. The tie down rail is often a stainless steel tube stock, directly bent, one-piece fabrication having two curved pipe section at the sides and center straight pipe section in the middle for the tie down rail. However, as the length of tie down rail results in longer packaging area, shipping cost, and cargo placement problems, the straight pipe section and the curved pipe section are cut into two curved pipe sections and one straight pipe section which necessitates assembly. However, even after such a design, the conjoinment structure between the two cut rail pipes still requires further research and development.

SUMMARY OF THE INVENTION

The objective of the invention herein is to provide a vehicle tie down rail conjoinment structure comprised of a first connector having a mounting surface at one extremity and an oblique slip-thrust surface formed at the opposite extremity; a second connector having a mounting surface at one extremity and an oblique slip thrust surface formed at the opposite extremity; given the said structure, a threaded fastening component is utilized to conjoin the first connector and the second connector into a single physical entity, wherein the first connector is inserted into the inner diameter at the end section of the curved anchor footing of a vehicle tie down rail and the second coupling section is inserted into the inner diameter of the straight, thin long pipe member at the end section of the vehicle tie down rail.

BRIEF DESCRIPTION OF THE DRAWINGS

Other features and advantages of the present invention will become apparent in the following detailed description of the preferred embodiment, with reference to the accompanying drawings in which.

DETAILED DESCRIPTION OF THE PREFERRED EMBODIMENTS

Figure 1:
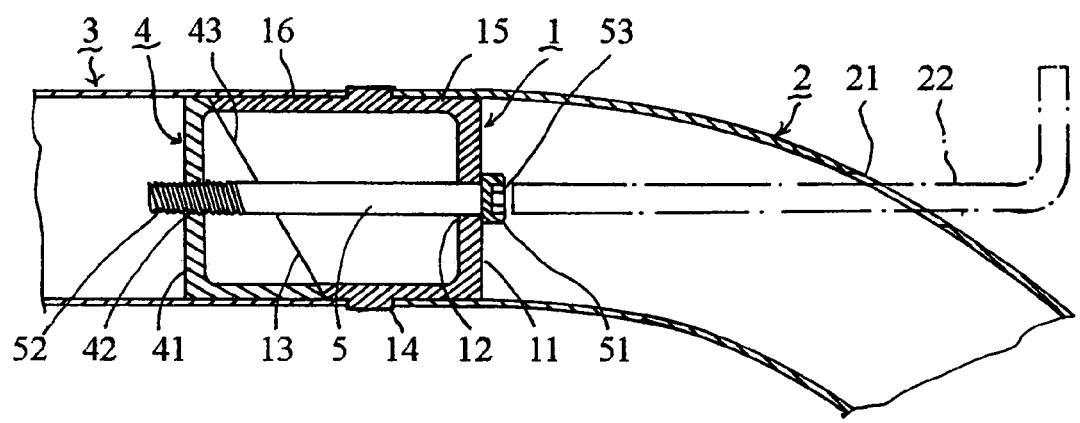
FIG. 1 is a cross-sectional drawing of the preferred embodiment structure of the invention herein.

In the detailed description of the preferred embodiments, it should be noted that similar elements are indicated by the same reference numerals throughout the disclosure.

Figure 2:
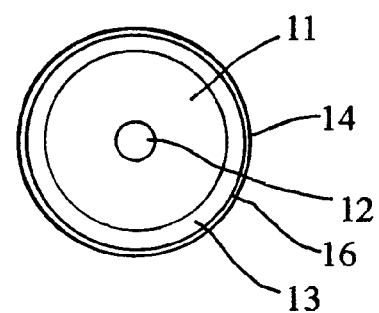
FIG. 2 is an orthographic drawing of first connector depicted in FIG. 1, as viewed from the left side.

Referring to FIG. 1 and FIG. 2, the preferred embodiments of the invention herein is comprised of:

A first connector 1 of a cylindrical shape having a mounting surface 11 at the sealed tubular end section of one extremity and there is a hole 12 in the mounting surface 11; an oblique slip thrust surface 13 facing away from the mounting surface 11 is formed at the opposite extremity; an annular flange 14 around the outer diameter of the first connector 1 that partitions it into a first coupling section 15 and a second coupling section 16, wherein the first coupling section 15 has a first outer diameter that fits into the inner diameter of a curved anchor footing 2 at the end section of a vehicle tie down rail, the second coupling section 16 has a second outer diameter that fits into the inner diameter of a straight, thin long pipe member 3 at the end section of the vehicle tie down rail; wherein, the mounting surface 11 is situated at the end surface of the said first coupling section 15, and the oblique slip thrust surface 13 is situated on the second coupling section 16.

A second connector 4 of a cylindrical shape having a mounting surface 41 at the sealed tubular end section of one extremity and there is a threaded hole 42 in the mounting surface 41; an oblique slip thrust surface 43 facing away from the mounting surface 41 is formed at the opposite extremity; and the second connector 4 outer diameter fits into the inner diameter of the straight, thin long pipe member 3.

A threaded fastening component 5, a bolt consisting of a head section 51 at one end, threads 52 at the other extremity, and a hexagonal socket 53 in the head section 51, which is inserted through the first connector 1 mounting surface 11 hole 12 and screwed into the second connector 4 mounting surface 41 threaded hole 42.

To conjoin, the oblique slip thrust surface 13 and slip thrust surface 43 of the first connector 1 and the second connector 4 are first correspondingly placed in an upper-lower, male-female arrangement, and after the threaded fastening component 5 is tightened to an appropriate degree, the entire first connector 1 first coupling section 15 is inserted into the inner diameter at the end section of the curved anchor footing 2 of a vehicle tie down rail, and the first connector 1 second coupling section 16 along with the second connector 4 are inserted into the inner diameter of the straight, thin long pipe member 3 at the end section of the vehicle tie down rail to thereby completing conjoinment.

However, for conjoinment tightness, an opening 21 is cut into the curved anchor footing 2 to admit a hexagonal wrench tool 22 to tighten the threaded fastening component 5 such that when the slip thrust surface 13 and the slip thrust surface 43 are thereby brought together, the radially distributed force vectors the upper and lower extents of the first connector 1 and the second connector 4 against the inner diameter at the end section of the thin long pipe member 3, the said applied force affecting the end affixed to the curved anchor footing 2 on the vehicle, enabling the first connector 1 first coupling section 15 to be insertionally retained in the inner diameter at the end section of the curved anchor footing 2, thereby effectively achieving a solid union.

During utilization, all the conjoinment components can be installed in reverse, enabling the conjoinment of the first connector 1 first coupling section 15 to the inner diameter at the end section of the straight, thin long pipe member 3 in vehicle tie down rail as well as the conjoinment of the first connector 1 second coupling section 16 along with the second connector 4 to the inner diameter at the end section of the curved anchor footing 1.

While the present invention has been described in relation to what is considered the most practical and preferred embodiments, it is understood that the invention herein is not limited to the disclosed embodiments, but is intended to cover various arrangements included within the spirit and scope of the broadest interpretations and equivalent arrangements.

What is claimed is:

1. A vehicle tie down rail conjoinment structure comprised of:
    a first connector having a mounting surface at one extremity and an oblique slip-thrust surface formed at the opposite extremity;
    a second connector having a mounting surface at one extremity and an oblique slip-thrust surface formed at the opposite extremity;
    a threaded fastening component utilized to conjoin said first connector and said second connector into a single physical entity, wherein said first connector is inserted into the inner diameter at the end section of a curved anchor footing of a vehicle tie down rail and said second connector is inserted into the inner diameter of a straight, thin long pipe member at the end section of the vehicle tie down rail.

2. A vehicle tie down rail conjoinment structure as defined in claim 1 wherein said first connector has an annular flange around its outer diameter that partitions it into a first coupling section and a second coupling section, wherein said first coupling section has a first outer diameter and said second coupling section has a second outer diameter.

3. A vehicle tie down rail conjoinment structure as defined in claim 2 wherein said first connector further has a mounting surface situated at the end surface of said first coupling section, and said oblique slip thrust surface is situated on said second coupling section.

4. A vehicle tie down rail conjoinment structure as defined in claim 3 wherein said second connector has a mounting surface, said first connector has a hole in its mounting surface and said second connector has a threaded hole in its mounting surface which thereby enables the conjoinment of said two connectors into a single structural entity.

* * * * *